US006267062B1

(12) United States Patent
Hamilton, Jr.

(10) Patent No.: US 6,267,062 B1
(45) Date of Patent: Jul. 31, 2001

(54) AC DRIVE INDUSTRIAL SWITCHING LOCOMOTIVE

(76) Inventor: Hugh B. Hamilton, Jr., 107 James St., Greenville, SC (US) 29609

( * ) Notice: Subject to any disclaimer, the term of this patent is extended or adjusted under 35 U.S.C. 154(b) by 0 days.

(21) Appl. No.: 09/281,035

(22) Filed: Mar. 30, 1999

Related U.S. Application Data

(63) Continuation-in-part of application No. 09/261,781, filed on Mar. 3, 1999.
(60) Provisional application No. 60/079,961, filed on Mar. 30, 1998.

(51) Int. Cl.$^7$ .................................................. B61C 1/00
(52) U.S. Cl. ..................... 105/26.05; 105/34.1; 105/35; 105/49; 105/61; 105/62.1; 105/73
(58) Field of Search .................. 105/26.05, 34.1, 105/35, 49, 26.1, 48, 61, 62.1, 67, 73, 76, 77, 78

(56) References Cited

U.S. PATENT DOCUMENTS

| 547,068 | * | 10/1895 | Gaither et al. ................... 105/456 |
| 3,713,504 | * | 1/1973 | Shimer et al. ................... 180/65 R |
| 4,067,264 | * | 1/1978 | Ensink ............................. 105/456 |
| 5,611,284 | * | 3/1997 | Smith et al. ..................... 105/220 |

FOREIGN PATENT DOCUMENTS

| 021057- A2 | * | 1/1987 | (GB) | .............................. B61C/9/24 |
| 210057 | * | 1/1987 | (EP) | .............................. B61C/9/24 |

* cited by examiner

*Primary Examiner*—S. Joseph Morano
*Assistant Examiner*—Frantz F. Jules
(74) *Attorney, Agent, or Firm*—Flint & Kim, P.A.

(57) ABSTRACT

The two axle locomotive of this invention includes a diesel engine directly coupled to a generator for generating power to a single electrical traction motor. Preferably, the drive motor is an AC traction motor which drives both axles of the locomotive using a single drive shaft assembly with a drive shaft affixed to an armature of the AC traction motor. Power to the AC traction motor is controlled by using a variable frequency alternating current control system. Auxiliary equipment power is also provided by the AC generator. In addition, by reversing the current in the AC traction motor the motor becomes an AC braking motor. Changes in the traction ability of each axle resulting from weight transfer between the two axles is automatically compensated for by the single drive shaft assembly. The suspension system includes a locomotive frame supported by the pair of axles using elastomeric springs, which also provides dynamic damping to limit the motion of the locomotive. The locomotive frame has a horizontal platform having two portions which allow the locomotive to be disassembled, shipped and reassembled at a remote location for its intended use.

22 Claims, 6 Drawing Sheets

AC DRIVE INDUSTRIAL SWITCHING LOCOMOTIVE

This application is a C-I-P of Ser. No. 09/261,781 filed Mar. 3, 1999 and also claims the benefit Provisional No. 60/079,961 filed Mar. 30, 1998.

BACKGROUND OF THE INVENTION

This invention relates to yard and switching locomotives for relocation of train cars, and more particularly to a low speed locomotive having a simplified two axle design powered and suspension system which provides for increased traction, particularly at low speeds.

Switching or yard locomotives have been used since the invent of locomotives to perform the tasks associated with moving and relocating cars within a train switching yard, an industrial plant or a distribution center. These locomotives are designed for short distance pulling, moving and repositioning of train cars at relatively low speeds. They are required to operate at relatively large adhesion or traction forces starting from a stopped position to a transporting speed. A large portion of their time is spent connecting to, starting and stopping the train cars that are relocated from place to place. These switching locomotives must be designed to accomplish these tasks in an efficient cost effective manner.

Conventional switching locomotive designs of the present include a large diesel engine directly coupled to a direct current (DC) generator to convert the mechanical power into DC power. The DC power is supplied to a DC drive control cabinet that controls the amount of energy to two DC motors to convert electrical energy into mechanical energy at the wheels to drive the locomotive. A problem with the DC motor efficiency is observed at the very low end of the speed range where the static pulling force is large when the train is starting to move. The DC system efficiency at low speeds is commonly measured to be only about 50 percent. A separate alternator is also necessary to generate auxiliary AC power with this DC system. Conventional switching locomotives have four axles with two axles in each tractor portion of the locomotive. Each tractor is driven by a separate AC motor driving both axles. Weight transfer occurs when the locomotive is pulling or pushing the train cars. The weight transfers so that one axle is loaded more and the other axle is loaded less. The amount of traction provided by the wheels in contact with the rails depends on the normal force or weight of the wheels on the rail. When one axle is unloaded the DC drive control must adjust the output of the DC motor so that the wheels will not spin out of control. Therefore, two motors working at about 60 percent of their full rating is not uncommon. The two tractor system with four axles driven by two DC motors can become very inefficient. The DC generator size and the horsepower of the diesel engine must also compensate for the lower efficiency of the DC system. In addition, braking traction is generally not available using the DC motors of this conventional locomotive.

The two tractors of the conventional locomotive are also made to swivel with respect to the frame of the locomotive. This is necessary for the locomotive to be able to negotiate turns and keep the wheels in contact with the track. Each axle is sprung with respect to the tractor and the tractors are sprung with respect to the frame of the locomotive. The suspension and swivel systems with two tractors results in a number of expensive mechanical components which must be maintained and lubricated. In addition, the DC driven locomotive is relatively heavy and transporting the locomotive over long distances for use at another location is slow and generally must be accomplished by a rail system.

The need remains to solve the problems outlined above for the conventional switching locomotive. The problems of locomotive system efficiency, weight transfer and traction control between axles, added suspension maintenance and lubrication, transportation needs between use locations, auxiliary AC power, braking of the locomotive and an overall cost effective design are the subject of this invention; as disclosed in the following sections.

Accordingly, an object of the present invention is to provide a locomotive having an efficient and cost effective drive train system that provides traction control between drive axles.

Another object of the present invention is to provide an unsprung wheel/axle system supporting the locomotive so that controlled pitch and roll attitudes exist during various operations of the locomotive including driving and braking with various drive train systems.

Yet another object of the present invention is to simplify the suspension system and the number of necessary components between the frame of a locomotive and the unsprung wheel/axle system, while maintaining adequate ride comfort.

A further object of the present invention is to provide a locomotive that can be disassembled and shipped to a remote location using standard highway trucking means.

An additional object of the present invention is to provide a switching locomotive which is easy to operate in a safe manner at a reasonable switch engine speed, and requires little maintenance.

SUMMARY OF THE INVENTION

The above objectives are accomplished according to the invention by providing a low-speed, high-traction industrial switching locomotive which automatically compensates for wheel slippage, weight transfer, and wheel diameter and track variations. The high-traction locomotive comprises a locomotive frame and first and second frame-mounted wheel axles mounted to the locomotive frame in a generally fixed relationship. The first and second wheel axles are longitudinally spaced along a length of said locomotive frame to define a frame wheel base between the center lines of the first and second fixed wheel axles. Drive wheels are carried by opposing ends of said first and second wheel axles for driving the locomotive on a rail. A drive motor, e.g. electrical or hydraulic, is affixed to the frame between the first and second axles having a rotor. A drive shaft is made one-piece with the rotor, or other drive member, of the drive motor to form a rotor drive shaft extending in opposing directions along a longitudinal axis of said locomotive generally perpendicular to the wheel axles. An electric or hydraulic power supply supplies power to the drive motor, and an electrical or hydraulic control system supplies controls the power requested of the drive motor. The preferred system includes an electrical AC drive motor.

Advantageously, a first gear box connects a first end of the rotor drive shaft to the first axle; and a second gear box connects a second end of the rotor drive shaft to the second axle. At least one first torque arm or linkage is connected between the first gear boxe and the locomotive frame to resist pitch and roll forces of the locomotive. At least one second torque arm or linkage is connected between said second gear box and the locomotive frame for again resisting pitch and roll forces of the locomotive. First and second linkages helping compensate for pitch and roll deflections of the locomotive during various operations of the locomotive. Similar braking linkages are also provided with the braking systems of each axle to control pitch and roll attitudes of the locomotive during braking. The wheel axles are mechanically or electrically interlocked through the rotor drive shaft of the electrical drive motor and the respective first and second gear boxes to automatically proportion torque from the drive motor to the axles depending on the traction available between the axle wheels at the rail to automatically compensate for wheel slippage, weight transfer, and wheel diameter and track variations. Two drive motors, being one for each axle, can also be used if they are electronically or mechanically linked to operate as a unit.

Preferably, the drive or traction motor is a single AC electrical motor, and the motor control includes an AC motor controller for supplying variable frequency electrical power to the AC drive motor. The first torque arm or linkage is connected between the first gear box and the locomotive frame, on a traction motor side of the first wheel axle, and the second torque arm or linkage is connected between the second gear box and the locomotive frame on a traction motor side of the second wheel axle so that said torque arms effectively resist pitching motions about the wheel axles to effectively reduce uncoupling of said locomotive from a coupled railroad car. The first and second torque arms or linkages are offset from the longitudinal centerline of the locomotive to resist roll motions.

The first and second gear boxes include a gear reduction which reduces the speed of said locomotive to less than about 10 mph with high traction so that an efficient engine may be utilized. The AC traction motor which allows much better traction efficiency than a standard DC drive system. Furthermore, instead of a conventional four-axle locomotive, fixed two-axle locomotive obtains approximately the same amount of adhesion or traction. Going to the two-axles, with a variable frequency AC drive and mounting each axle to be directly supported by the frame of the locomotive, a single AC traction motor can be used to drive both axles. The cost and size of two AC or DC traction motors would be less desirable then the single larger AC traction motor.

When the locomotive is pulling on a train car it loads-up and the weight transfers to the rearward axle and the forward axle tends to unload. Having one large motor instead of the two smaller motors, the weight transfer can be a 40/60 split instead of a 50/50 split, depending on the weight of the locomotive and the friction producing the traction. To get the same amount of power, because the locomotive is bi-directional, you would have to have two traction motors rated 60% of the full rating for the conventional locomotive instead of the one traction motor rated at 100% for the preferred locomotive of the present invention.

Advantageously, the traction supplied through each axle and wheel of the present invention automatically compensates through a single armature-shaft driving a two-ended drive shaft assembly. If the forward wheels unload due to the weight transfer, the rearward axle would be more heavily loaded and the AC traction motor would automatically drive the rearward axle more as opposed to the forward axle. You do not lose any traction because you have the same amount of total traction available through the single armature-shaft assembly. The single two-ended shaft does not care which end is taking the most torque. Whether the locomotive is moving forward or backward (bi-directional) makes no difference.

Because the AC traction motor is geared down by using a variable frequency it comes up to an efficient operating speed almost immediately. Consequently, the efficiency of the system is about 90% versus 50% for comparable DC drive system at the low speed end; so that a much smaller diesel engine is used to get the same amount of traction power to the rail in driving the locomotive. Typically, a diesel having the AC power system of this invention can be roughly ⅔ the size of a conventional locomotive diesel. Also, the smaller diesel does not have to have the same amount of auxiliary power, resulting in an additional savings. The overall system design of this invention is far more efficient.

The diesel engine and AC generator (an AC alternator) is a self-excited unit which has no slip rings or brushes. The AC generator is modified for the design of the present invention, but is roughly an off-the-shelf type AC alternator. Typically a 480 volt, 3 phase AC current, is generated and auxiliaries, such as a traction motor blower and an air compressor, are able to run directly off the AC power cable. This eliminates the need for a separate auxiliary AC alternator, which is the standard on virtually all conventional locomotives.

The AC motor is used to generate braking forces by using the variable frequency drive control, with the same advantages as previously discussed for wheel slide control. The wheel slide control in braking parallels the wheel slip control in driving with the AC traction motor. The motor acts as a generator and the power generated is burned off in the braking grids mounted in front of a radiator of the engine.

The springs between the axles and the frame of the locomotive are of an elastomeric plate design to greatly simplify the mounting of the wheels and axles; as opposed to the much larger coil springs, dampers and linking components required for a conventional locomotive's suspension system. Because the elastomeric springs of the present invention are mounted down low in the frame, the design allows for more frame area and a very rigid frame; resulting in a much more rugged design. This also simplifies the mounting of the wheel axles to the locomotive. The suspension system of this invention is purposely designed to be very soft because the locomotive is geared for top speed of 10 mph. With that relatively low top speed, the soft sprung suspension system will make the locomotive track very closely to the uneven rail conditions, which is the norm in most industrial plants. There is also built-in damping in the elastomer which obviates the need for a separate damper or shock absorber system. The rubber type elastomeric springs also isolates the car body from the vibration and shocks of the road bed, which further enhances and improves the operational locomotive from a ride comfort stand-point and the stand-point of shock on the individual components.

The locomotive is also designed so that the locomotive can be shipped in halves on a highway, rather than by rail. The top half separates from the bottom half so that each half can be shipped on a low-boy trailer over the highway.

From a maintenance standpoint, the locomotive of the present invention requires very little maintenance. The AC traction motor requires occasional greasing of the bearings, unlike a DC traction motor which requires frequent brush changes and maintenance of the commutator.

DESCRIPTION OF THE DRAWINGS

The construction designed to carry out the invention will hereinafter be described, together with other features thereof.

The invention will be understood from a reading of the following specification and by reference to the accompanying drawings forming a part thereof, wherein an example of the invention is shown wherein.

DESCRIPTION OF PREFERRED EMBODIMENTS

Referring now in more detail to the drawings, the invention will now be described in more detail.

Figure 1:
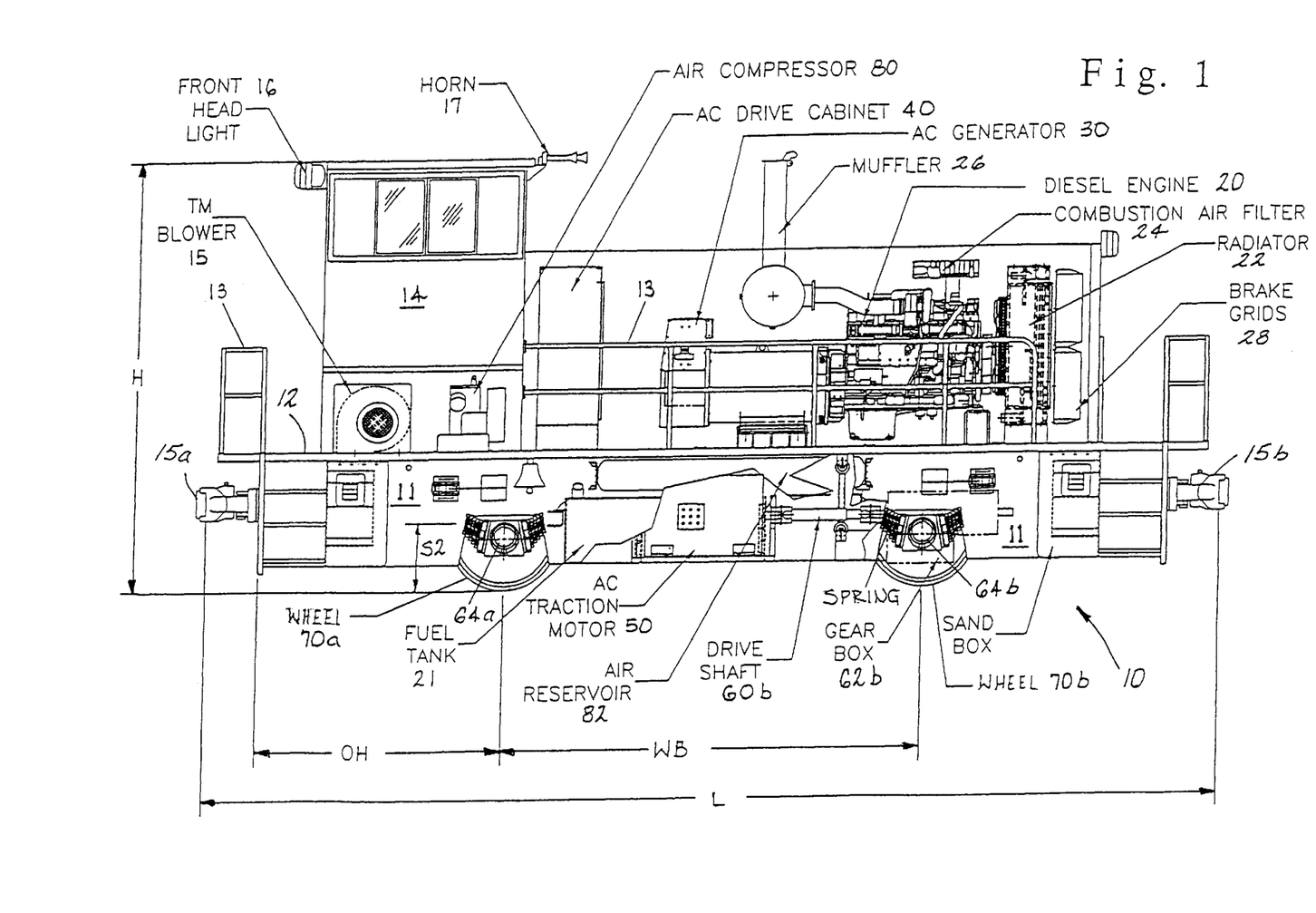
FIG. 1 is a side elevation view of the locomotive of the present invention.

A side view of a high traction switching locomotive 10 of this invention is illustrated in FIG. 1. The locomotive frame includes an upper frame portion U having a thick steel plate forming a horizontal platform 12 with handrails 13 to support and protect switch person operating the locomotive and a lower frame portion B including box portion 11 having cutouts for mounting the frame to be supported by the two axles 64a and 64b. The lower frame portion is constructed with two lateral sides, a top and a bottom. The axles are generally fixed from rotation and do not swivel with respect to the locomotive frame. A cabin 14 carried by the upper frame protects the operator of the locomotive from the environment. The locomotive has an overall length L with a wheel base length WB and an overhang length OH from the cabin end of the platform. The normal operating equipment includes a front headlight 16 and a horn 17. The locomotive is preferably limited to speeds less than about 10 miles per hour. This limitation assists in using only two non-swiveled axles mounted to the locomotive lower frame and spaced relatively close together to provide a short turn radius (WB relatively small). This is a unique feature of this invention not found on high traction switching locomotives.

Power is generated for the power train components of the locomotive 10 by a diesel engine 20 mounted on upper frame U above the platform 12. In the preferred embodiment, the diesel engine is directly coupled to an alternating current (AC) generator 30 also mounted on platform 12. The AC generator is an AC alternator providing an alternating current that is fed to a AC drive cabinet 40 is also located above the platform 12. The drive cabinet contains electrical components to provides a variable frequency alternating current to power the AC traction motor 50. The drive cabinet also provides an AC voltage supply for other components, such as the TM blower, the lights and an air compressor 80 to pressurize an air reservoir 82.

Speed control and the amount of power fed to the AC traction motor 50 by the electrical components in the drive cabinet 40 is regulated by using a variable frequency system. The preferred AC control system provides a 0–480 volt AC variable frequency traction drive which is IGBT based. A preferred AC traction motor is an AC 3 phase induction motor operating at a maximum of 3000 revolutions per minute.

Figure 2:
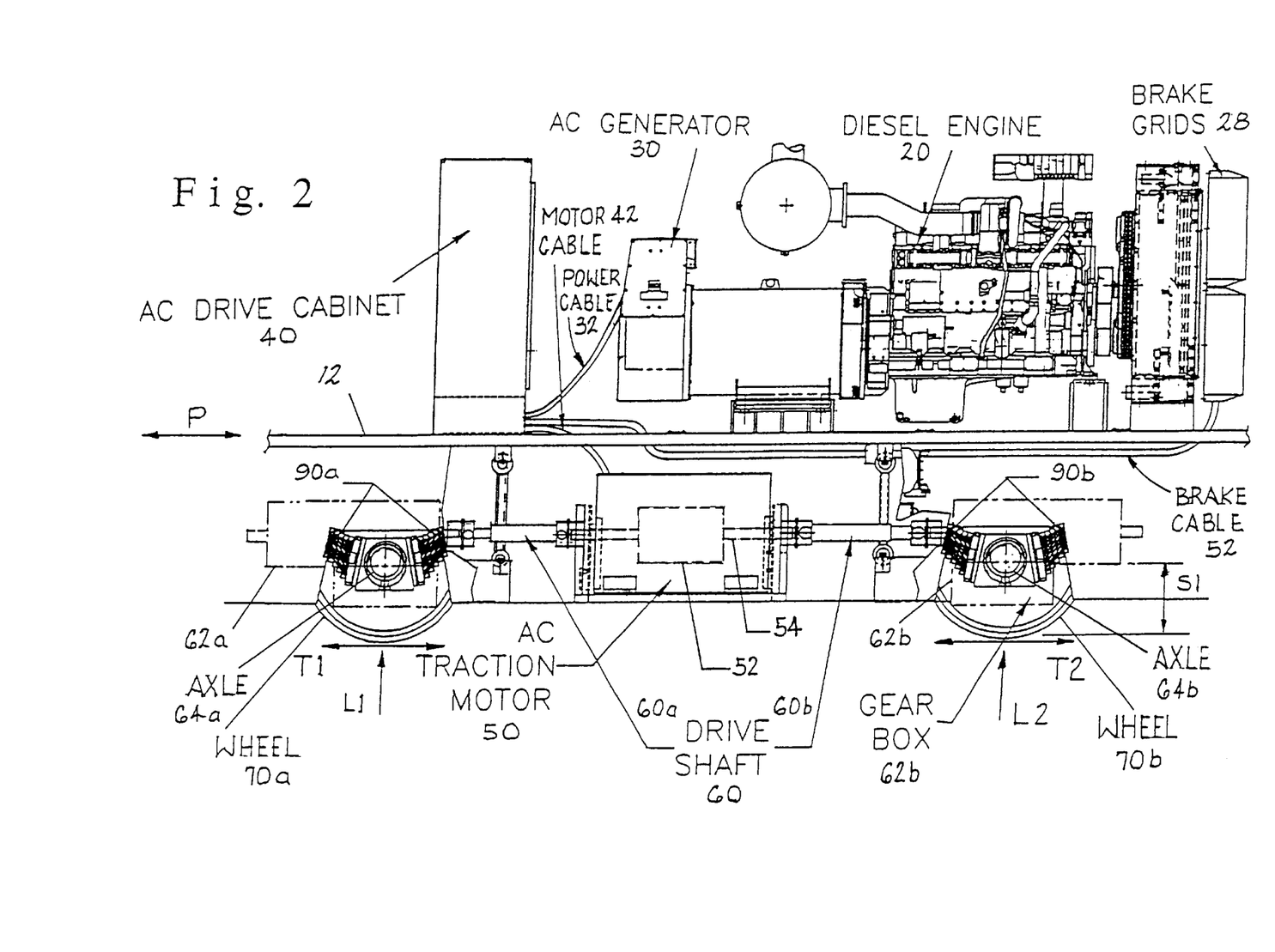
FIG. 2 is a side elevation view of the power train portions of the invention thereof.

A drive shaft 60 is directly coupled to the armature of the drive shaft 54 motor providing an armature-shaft assembly to drive the two axles 64a and 64b of the locomotive through gear boxes 62a and 62b, as illustrated in FIGS. 1 and 2. Both axles are driven at the same time to provide the same rotational speed of the wheels 70a and 70b. Fuel tank pods 21 are carried to the outside of the lower box portion for storage of diesel fuel for the diesel engine.

The power train of the present invention is illustrated in more detail in FIG. 2. The diesel engine 20, the AC generator 30 and the AC control cabinet 40 are mounted above the horizontal platform 12 on upper frame U. In the preferred embodiment of the invention, the diesel engine is directly coupled to AC generator. Diesel engines in a range of about 525 horsepower to about 750 horsepower are preferred for the locomotive of this invention. The AC generator 30 is an AC alternator that generates 480 volt, three phase alternating current. A power cable 32 transmits electrical energy from the AC generator 30 to the AC drive cabinet 40. The controls for the electrical systems of the locomotive are housed within the AC drive cabinet, including logic circuits for the variable frequency voltage and current supplied to the AC traction motor through a motor cable 42. A traction motor blower 15 supported by the platform 12 is provided to supply air through an air duct (not shown) to cool the traction motor. Control cables are also provided between each component of the power train.

The armature or rotor 52 of the AC traction motor is directly coupled with the internal motor shaft 54. The motor shaft is integral with the drive shaft 60 with drive shaft end sections 60a and 60b coupled with gear boxes 62a and 62b respectively. Gear box 62a turns drive axle 64a and gear box 62b turns drive axle 64b. The drive axles are affixed to the wheels 70a and 70b which drive the locomotive through traction with supporting tracks or rails (not shown).

The locomotive is carried by the track loads L1 and L2 as illustrated in FIG. 2. These loads are about the same for the weight of the locomotive; as its center of gravity is horizontally about midway between the two axles. In general, the higher the track loads L1 and L2 the higher the frictional traction forces T1 and T2 respectively. Ballast weights can be added to the locomotive to increase loads L1 and L2. When the locomotive is pulling or pushing, as shown by the arrow T, the traction forces T1 plus T2 must be approximately equal to the pulling or pushing load P for the locomotive to maintain a constant velocity on a level track. T1 plus T2 must be larger than P to accelerate the locomotive. When the pulling or pushing load is to the right in FIG. 2 load L1 decreases and load L2 increases. This is the weight transfer referred to in the summary section. The left traction force T2 will decrease and the right traction force T2 will increase. The result is that a higher torque T2×S1 will be transmitted by the axle end section 60b than the torque T1×S1 transmitted by axle end section 60a. However, the total system torque will be self controlled as a result of the single drive shaft 60 arrangement. The single shaft does not care which end is being loaded as long as the total torque requirement is being provided by the AC traction motor.

Hydraulic power systems can also be used with the locomotive of this invention. The hydraulic power system includes a hydraulic reservoir and a main pump coupled to the diesel or gasoline engine. Control valves selectively route hydraulic fluid to a torque converter to provide the traction motor 50 of the switching locomotive 10. Alternately, the hydraulic power system can be mechanical gears coupled to a torque converter within the scope of this invention. In addition, two electric or hydraulic traction motors, with one for driving axle 64a and the other for driving axle 64b, can be used within the scope of this invention if the traction motors are coupled or otherwise mechanically or electrically linked together to operate as a single unit in driving both axles. However, the preferred power system of this invention is the more economical diesel engine coupled to an AC alternator supplying power to an AC drive cabinet to provide controlled frequency AC voltage to a single AC traction motor.

Figure 5:
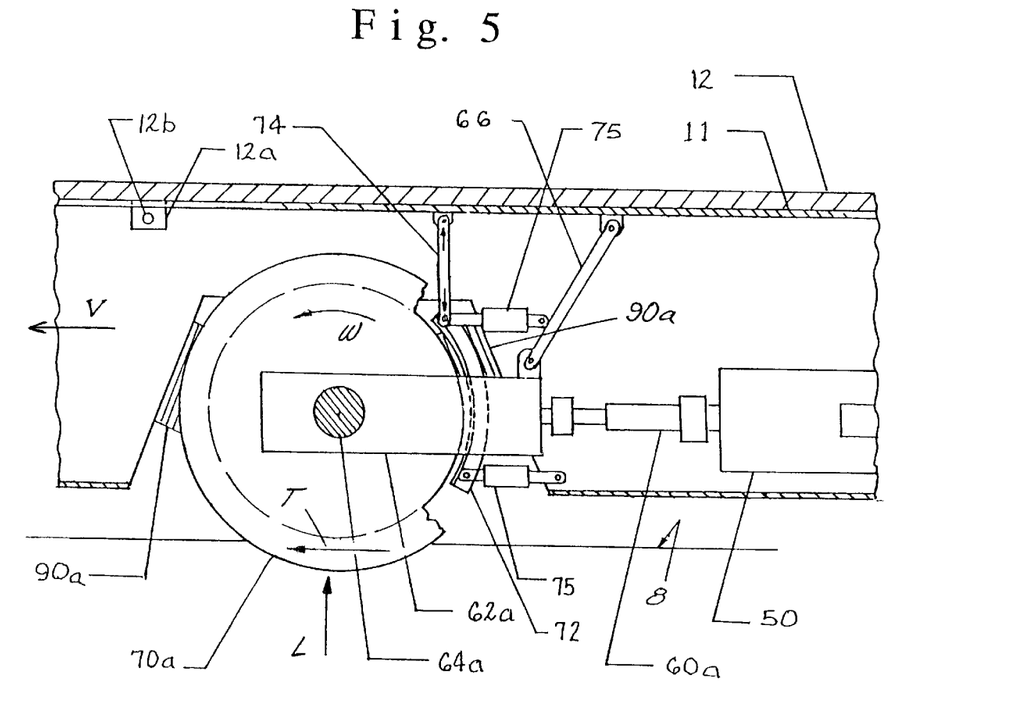
FIG. 5 is a cross-sectional view taken perpendicular to one axle of the locomotive showing suspension system components for the unsprung mass drive components and the brakes.
Figure 5A:
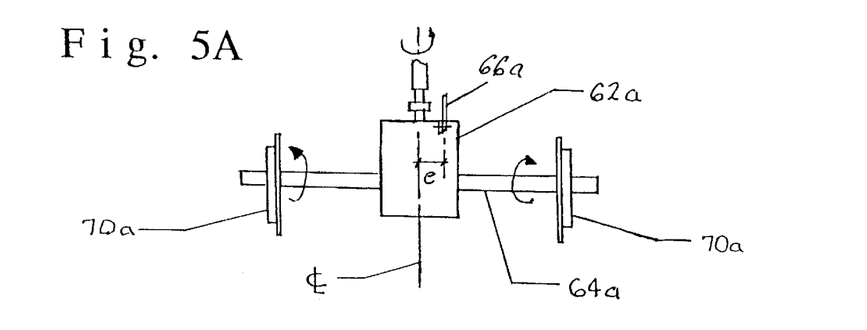
FIG. 5A is a plan view of an axle with wheels and a gear box showing the attachment location of a torque arm to the gear box.

The commonly driven drive shaft 60 in combination with the unique two axle suspension system of this invention results in an efficient switching locomotive. The locomotive includes the unsprung mass of the wheels, axles and gear boxes being directly suspended from the frame of the locomotive as illustrated in FIGS. 2 and 5. Included within the locomotive's suspension system is elastomeric springs 90a and 90b. The relatively low speeds of the locomotive of this invention allows the suspension system to be greatly simplified from the conventional locomotive. The lack of smooth and flat tracks or rails are not a factor in controlling the movements of the locomotive and the ride comfort of the operator. Therefore, the use of elastomeric spring components 90a and 90b result in a safe operation of the locomotive and a smooth ride. These rubber like elastomeric springs also provide damping to the overall dynamics of the locomotive without the addition of separate damping components. A spring angle of each spring centerline is maintained at a small value from the horizontal. The preferred spring angle is about 11 degrees from the horizontal axis of the locomotive.

The use of springs to support the sprung mass, including main structural components and equipment of the locomotive, makes the sprung mass rotate with respect to the train rails. A characteristic of any locomotive pulling a load is to pitch from end to end around a lateral axis through the center of gravity of the locomotive. In addition, the locomotive will roll from side to side around a longitudinal axis through the center of gravity when torque is applied to the axles from the drive shaft. Both the pitch and roll are compensated in the switching locomotive of this invention.

Figure 6A:
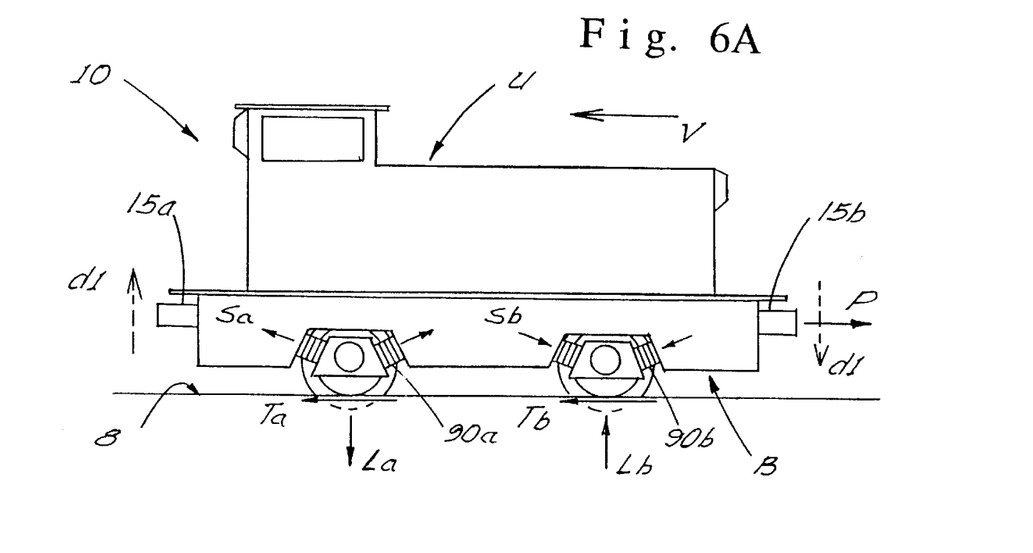
FIG. 6A is an elevation side view of the locomotive of this invention moving to the left and pulling a load.
Figure 6B:
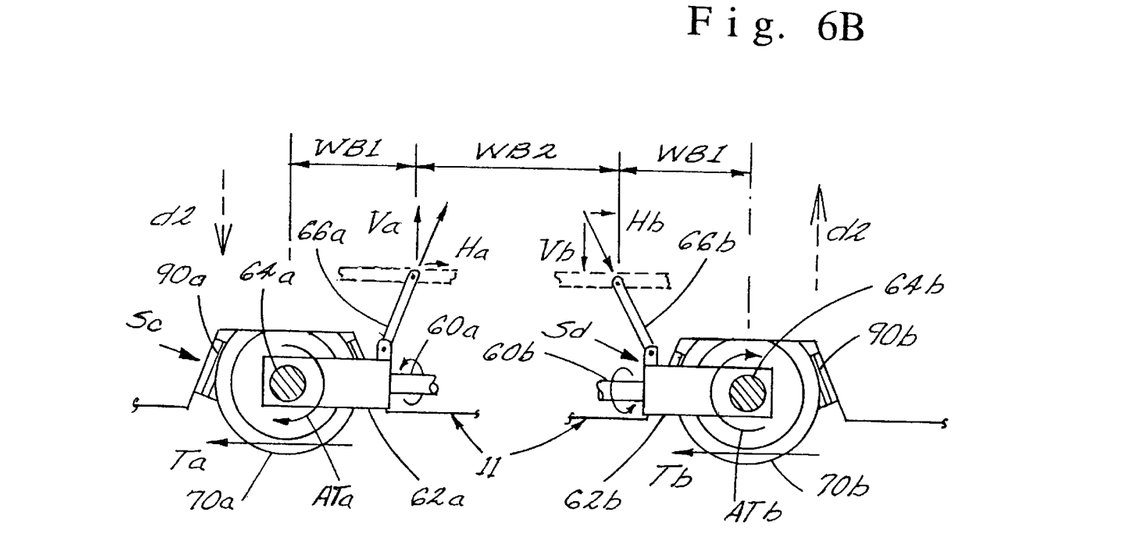
FIG. 6B is a partial side elevation view of the two wheel portions of the locomotive of this invention showing the suspension linkage for the gear boxes of each axle and wheel arrangement.
Figure 6C:
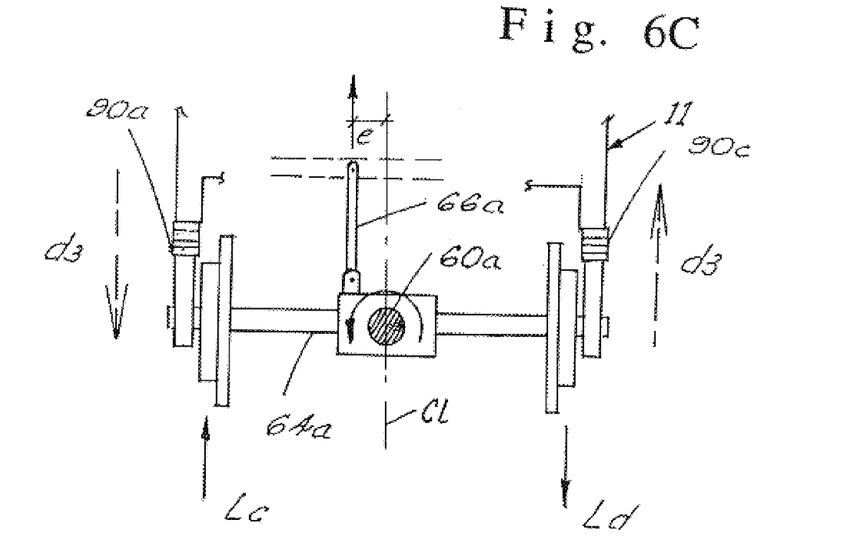
FIG. 6C is a partial front elevation view of the front axle and wheels suspended from the locomotive.

Further discussion of the control of the pitch and roll of the locomotive 10 is supported by the illustrations of FIGS. 6A, 6B and 6C. In supporting the sprung mass from the unsprung mass, additional suspension components and their proper location is required to control the pitch and roll of the locomotive. Stability of the couplers 15a and 15b at each end of the locomotive is critical for maintaining coupled contact with the cars being towed. A stable coupler location above the track must be maintained when the locomotive is pulling, pushing or breaking. Pitching and twisting of the couplers will cause decoupling of the cars from the locomotive. The sprung mass (upper U and base B portions of the locomotive) is supported by the unsprung wheel-axle set (each including two wheels, an axle and a gear box). The elastomeric springs 90a and 90b, discussed above, along with torque arms or linkages 66a and 66b, provide this support, as illustrated in FIGS. 5, 6A and 6B.

For the present discussion, consider the pulling force P exists to the right as the locomotive is pulling a load at a velocity V to the left, as illustrated in FIG. 6A. For the locomotive to pull a load, the traction forces Ta and Tb are directed to the left as illustrated. Defining the front of the locomotive to the left side and the rear of the locomotive to the right side in FIG. 6A, this pulling action causes the front wheels to have a decreased load La and the rear wheels to have an increased load Lb. The spring load Sa on the front springs 90a will be reduced and the spring load Sb on the rear springs 90b will be increased. This action produces a tendency for the locomotive to have a deflection "d1" upward in front at front coupler 15a and an approximately equal deflection d1 downward in at rear coupler 15b, as illustrated by the arrows in FIG. 6A. This tendency to deflect is countered by the unique suspension system provided between the wheels and the frame of the locomotive of this invention.

When torque is applied to drive shaft 60 by the traction motor 50, gear boxes 62a and 62b will rotate around the axles 64a and 63b when no restraint is provided. The torque arm or linkage 66a reacts this tendency of gear box 62a to rotate to the frame of the locomotive, as illustrated in FIG. 6B. The gear box 62b has a similar torque arm or linkage 66b. With the linkages both attached to a respective gear box located to the side of a respective axle in the direction of the traction motor, linkage 66b is in compression and is pushing up by the force Vb on the frame of the locomotive and linkage 66a is in tension and is pulling down by the force Va on the frame of the locomotive. The combined effect on the locomotive frame is the deflection "d2" which rotates the rear upward and the front downward (as shown by the arrows) to compensate the pitching deflection d1 of the locomotive. By an optimum selection of the positions WB1 and WB2 of the attachment of linkages 66a and 66b to the frame of the locomotive, a relative deflection d1–d2 can be obtained to stabilize the location of the couplers above the track.

The above described example, with traction forces Ta and Tb to the left and the locomotive pulling a load, works equally well when the traction forces and/or axle torque is reversed. For example, reversal occurs when the locomotive is pushing not pulling a load, pulling a load from the left coupler 15a or when the locomotive is braking using a reverse torque on the drive shafts 60a and 60b from the traction motor, as defined above for the variable frequency AC traction motor. The linkages reverse their action to automatically compensate the deflections and, once again, keep the relative deflection of the locomotive near zero. The locomotive of this invention is able to operate in an anti-pitch mode regardless of whether it is pushing or pulling from either end and during braking, as further described.

The torque arms or linkages are at an acute angle with respect to the horizontal frame portions of the locomotive to assist in maintaining the axle at their proper horizontal location with respect to the frame of the locomotive. When transmitting traction forces Ta and Tb to the lower box frame B of the locomotive, as illustrated in FIGS. 6A and 6B, the springs 90a and 90b on the front side of the axle have an increased compression force Sa and Sb. Reducing this increased force help keep the axles 64a and 64b in their proper horizontal positions. The horizontal force components Ha and Hb of the linkages help reduce the increased compression forces on the elastomeric springs, and assist in maintaining the axles in their proper horizontal positions.

This is also the case when the traction forces are reversed during other pulling, pushing and braking operations of the locomotive.

Figure 4:
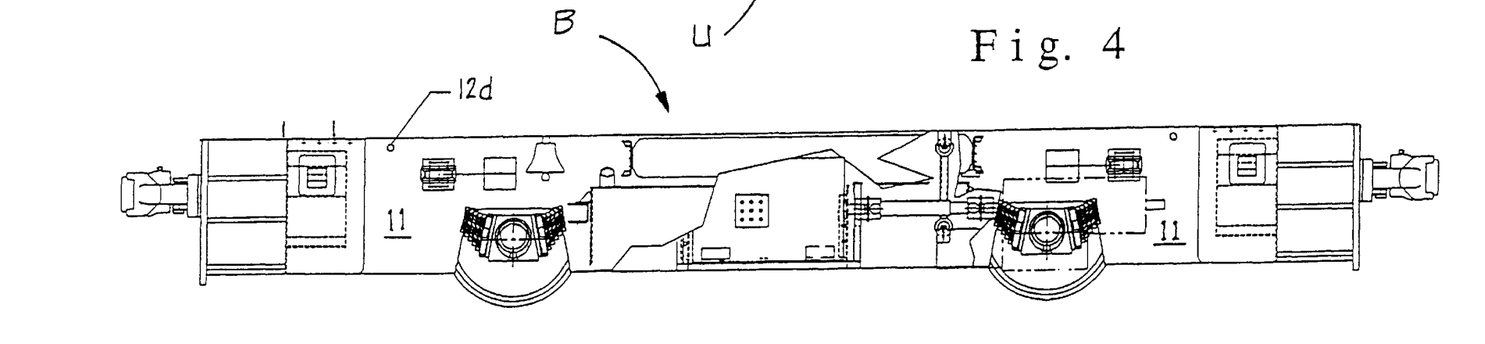
FIG. 4 is a side elevation view of a bottom portion of the locomotive as a separated half of the locomotive for shipping.

In a similar arrangement as disclosed to compensate for pitching of the locomotive, the roll tendency of the locomotive can be controlled by off-setting the torque arms 66a and 66b from the longitudinal centerline CL of the locomotive, as illustrated in the plan view of FIG. 4 and the elevation view of the front axle of FIG. 6C. The forward one of linkage arms 66a and 66b with respect to the direction of movement is always located on the side of center line CL away from the direction of torque. That is one linkage 66a is located to one side of the centerline a distance "e" and the other linkage 66b is located to the other side of the centerline an approximately equal distance. Once again, the torque arm or linkage which pushes up on the locomotive frame combines with the other torque arm or linkage pulling down on the locomotive frame to provide a moment to keep the locomotive from rolling; resulting in a side to side deflection "d3". The offset is selected to keep the deflection d3 as small as possible under all operating conditions.

As previously disclosed, the locomotive also attempts to pitch about a lateral axis when braking. For the example illustrated in FIG. 5, bake shoes are used to engage the wheels of the locomotive, the front of the locomotive has a tendency to dip downward and the load L is increased to increase the compression of the springs 90a. A schematic of a brake shoe 72 in a position to engage wheel 70a of FIG. 5 shows the correct position of the brake shoes to the side of the axle adjacent the traction motor 50. A brake torque arm or linkage 74 extends from the break shoe to the locomotive frame. When the brake cylinder 75 is activated to provide braking, the brake pad engages the wheel 70a and a braking torque T is present on the wheel to reduce the rotational frequency of the wheel. When the wheel is turning counterclockwise with an angular velocity "w" consistent with the linear velocity V of the locomotive, the brake torque arm or linkage 74 is in compression and pushes up against the locomotive frame to compensate for the tendency of the locomotive to pitch down in front. The same arrangement in reverse of that shown is provided with the second wheel 70b and axle 64b (FIG. 2 and 6A). The brakes are again placed to the side of the axle 64b adjacent the traction motor. The rear break linkage (not shown) is placed in tension to compensate for the tendency of the locomotive to pitch up in the rear by pulling down on the locomotive frame. A reverse action is present when the wheels are turning in the opposite clockwise direction, and the front of the locomotive has a tendency to deflect upward during braking. During the braking operation with clockwise rotation of the wheels, the front braking linkage is in tension and the rear braking linkage is in compression to once again compensate any tendency for the locomotive to pitch. The suspension and braking system of this invention thereby providing a stable location of the couplers above the top surface of the track 8.

The suspension system which essentially attaches the axles to the locomotive frame through elastomeric springs and has pitch and roll attitude control provided by the torque arms or linkages is unique to this invention. The locomotive is maintained in essentially a neutral pitch and roll attitude with respect to the train rails. The coupling between the locomotive and the train cars remains stable. This suspension system is independent of the type of power train system design being equally effective for a DC power train system or an AC power train system or a hydraulic torque convertor system.

Braking can be further enhanced with the use of preferred AC traction motor. The AC motor is controlled by a variable frequency control system which allows the AC traction motor to generate braking forces. This ability for braking is well known for this type of AC motor. Slip control is provided with the AC traction motor in a driving mode where slide control is provided with the AC motor becoming an AC braking motor. Movement between the wheels and the track are monitored and the AC motor frequency and current is adjusted so the power input or output is controlled. In braking, the AC motor 50 acts as a generator and the generated electrical power is transmitted back to the drive cabinet through the motor cable 42 and further by a brake cable 52 to the brake grids 28, as illustrated in FIG. 2. The brake grids become hot and are cooled by conduction, radiation and convection using a fan of the diesel engine 20.

Figure 3:
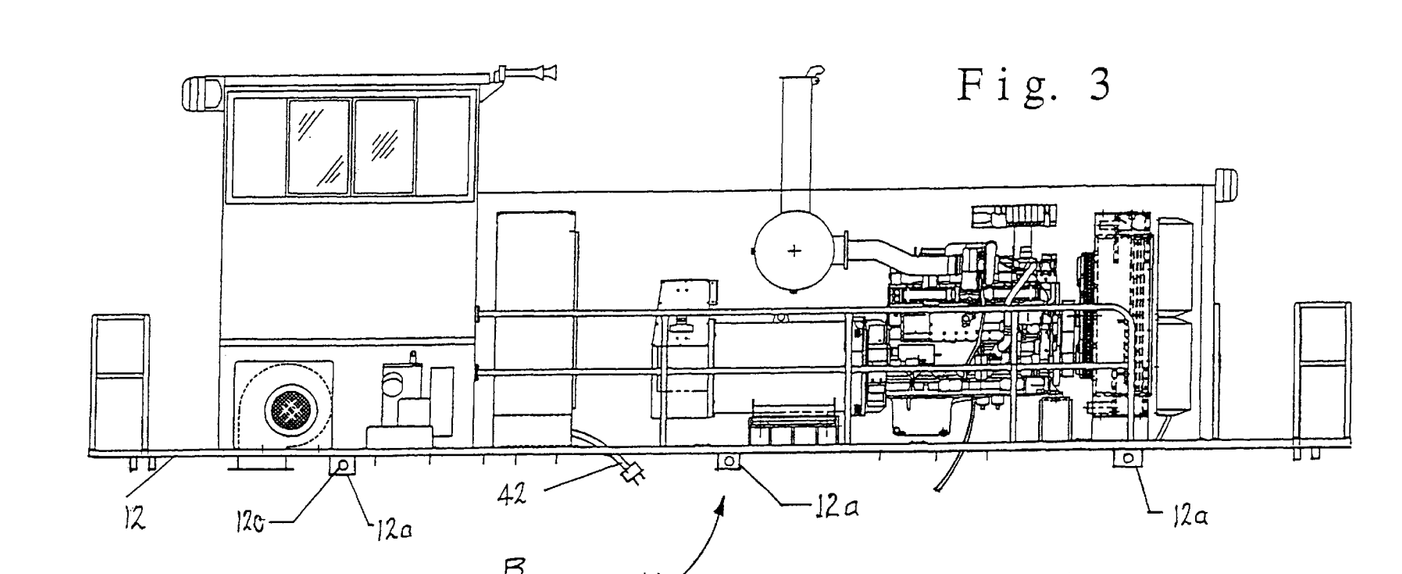
FIG. 3 is a side elevation of a top portion of the locomotive as a separated half of the locomotive for shipping.

The locomotive is designed to be shipped in two halves or portions using public highways. The locomotive splits into an upper frame section U and a bottom frame section B, as illustrated in FIG. 3. The split occurs at an interface between the horizontal platform 12 and the box portion 11 (FIG. 1). The result is that the platform 12 containing engine 20, generator 30, and AC drive 40 remain with the upper frame section; U and the box portion 11 containing motor 50 and gear box 62 frame section B. Each half weighs about the same with its respective components attached. The center of gravity for both portions is located horizontally about midway between the two axles. Each half is loadable on a trailer and trucked to the location where the locomotive will be used. At this location the lower frame section B is first placed on the tracks. A standard crane or hoist can be used for lifting each portion. The upper frame section U is placed on the bottom frame section B and the top and bottom portions are reconnected. Tabs 12a projecting from the horizontal platform 12 to engage cutouts in the lower box portion 11 and pins extend through holes 12c and 12d in the tabs and the sides of the lower box portion respectively to affix the upper and bottom portions of the locomotive frame together (FIGS. 2 and 5). Only a limited number of components connecting the must be reconnected i.e. components include the motor cable 42, fuel lines, compressed airlines, a duct for blower 15. Assembly requires only two hours.

Another unique feature of the locomotive of this invention is that it can be driven back onto the rails because the axles are fixed with the frame. This feature is cost efficient when the locomotive jumps the track for any reason. A standard "rerailer" device known in the industry, can be used to drive the train back onto the rails. Conventional high traction locomotives with swivel trucks can not do this.

Prototype Design Example

A typical locomotive has been designed by the inventor and is entitled the "RTX 500 Switching Locomotive". The following data is illustrative of the size and weight, operational parameters, power train components and other components of a typical prototype locomotive design of this invention.

Weight: 100,000 to 160,000 pounds, depending on use

Dimensions: 34'-4" long, L

10'-0" width

14'-2" height, H

Operations: 10 MPH speed, maximum 50,000 pounds tractive effort, weight dependent 75 feet curve radius, minimum Power Train: 525 to 750 horsepower diesel engine at 1800 RPM 480 VAC, 3 phase, 4 pole AC alternator 0–480 VAC variable frequency traction drive 3 phase AC traction motor, 3000 RPM max.

Accessories: Air Compressor
Air Brakes
Bell, Whistle, Headlights & Steplights
Cab with Heater Numerous other optional items including air conditioning, remote control, remote diagnostics, fire equipment, automatic brakes and dynamic braking can be provided within the scope of the locomotive design of this invention.

Figure 7:
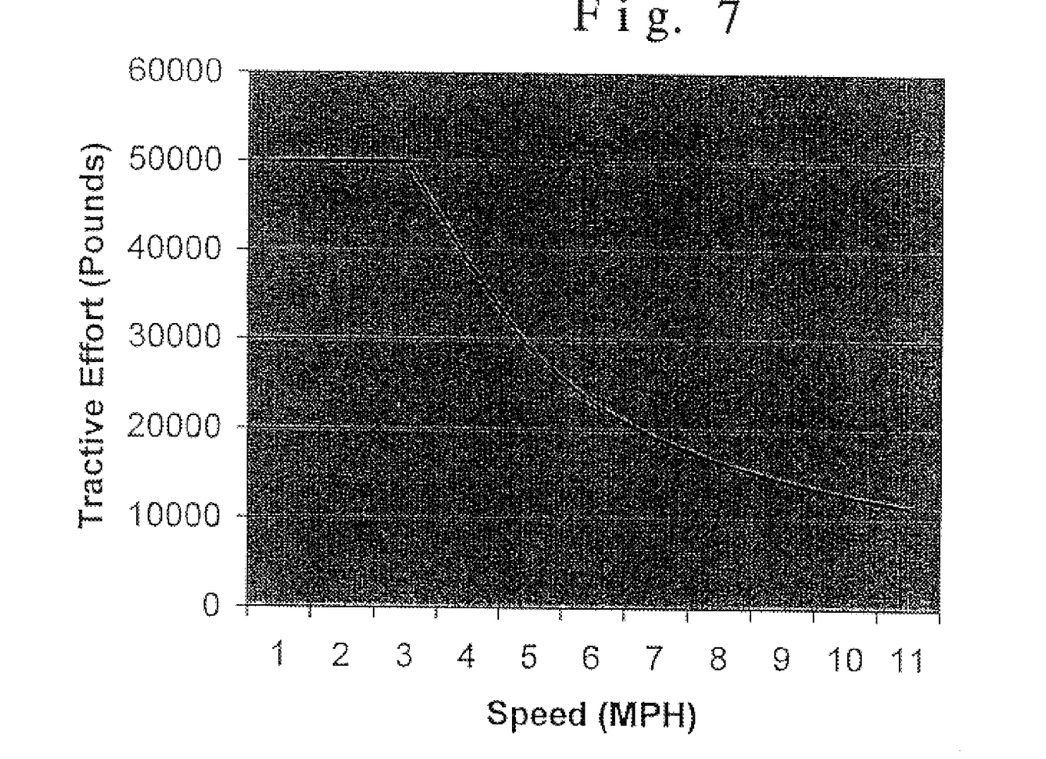
FIG. 7 is a graph of tractive effort vs. speed for a particular locomotive of the present invention.

A graph of the power curve for the RTX 500 locomotive of this design is shown in FIG. 6. The power curve 100 is a plot of the tractive effort as a function of the speed of the locomotive. A constant tractive effort of 50,000 pounds is provided from a stopped position to a speed of about 2.5 miles per hour. This effort allows the locomotive to accelerate the train cars from a static position, at which time less effort is required to keep everything moving at a reasonable speed or at a reasonable increase in speed. Therefore, the power curve can decrease at higher speeds. This is the case for the RTX 500 design as shown in FIG. 7.

While a preferred embodiment of the invention has been described using specific terms and values, such description is for illustrative purposes only. It is understood that changes and variations may be made without departing from the spirit or scope of the invention including the following claims.

What is claimed is:

1. A low-speed, high-traction industrial switching locomotive which automatically compensates for wheel slippage, weight transfer, and wheel diameter and track variations comprising:
   a locomotive frame;
   a first wheel axle mounted to said locomotive frame in a generally fixed directional relationship;
   a second wheel axle mounted to said locomotive frame in a generally fixed directional relationship;
   said first and second wheel axles being longitudinally spaced along a length of said locomotive frame to define a frame wheel base between the center lines of said first and second wheel axles and drive wheels carried by opposing ends of said first and second wheel axles for driving the locomotive on a rail;
   an electrical drive motor having a motor mounted drive shaft affixed to said frame between said first and second axles having a rotor;
   an electric power supply for supplying electrical power to said electrical drive motor and an electrical control for controlling the supply of electrical power to said electrical drive motor;
   a first gear box connecting a first end of said rotor drive shaft to said first axle;
   a second gear box connecting a second end of said rotor drive shaft to said second axle;
   a first and second torque arm directly connected with said first and second gear boxes and said locomotive frame for stabilizing said gear boxes;
   said wheel axles being interlocked through said drive shaft of said electrical drive motor and said respective first and second gear boxes to automatically proportion torque between said drive motor and axles depending on the relative traction between the axle wheels and said rail so that wheel slippage, weight transfer, and wheel diameter and track variations are automatically compensated for.

2. The locomotive of claim 1 wherein said electronic drive motor comprises an AC electrical motor, and said control includes an AC motor controller for supplying variable frequency electrical power to said AC drive motor.

3. The locomotive of claim 1 including a pair of opposing elastomeric springs connecting said wheel axles to said locomotive frame; and said pair of springs including a first spring connected between said axle and locomotive frame on one side of said axle, and a second spring connected between an opposing side of said axle and said frame and so that each said wheel axle is independently and softly sprung to said locomotive frame for increased traction.

4. The locomotive of claim 1 wherein said first torque arm is connected between said first gear box and said locomotive frame on a motor side of said first wheel axle, and said second torque arm is connected between said second gear box and said locomotive frame on a motor side of said second wheel axle so that said torque arms effectively resist pitch motions about said wheel axles to effectively eliminate unintentional uncoupling of said locomotive from a coupled railroad car.

5. The locomotive of claim 4 wherein said first and second torque arms are mounted offset in opposing directions with respect to a longitudinal center line of said locomotive to resist roll forces imparted to said gear boxes.

6. The locomotive of claim 5 wherein said first and second gear boxes include a gear reduction which reduces the speed of said locomotive to less than about 10 mph with high traction so that a smaller engine may be utilized.

7. The locomotive of claim 6 wherein said electronic drive motor comprises an AC electrical drive motor, and said control comprises a variable frequency AC drive which acts as a generator for supplying braking power to locomotive.

8. The locomotive of claim 1 wherein said power supply comprises an internal combustion engine, and an electrical generator driven by said engine.

9. The locomotive of claim 1 including a traction control for sensing the traction at said wheels of said wheel axles and adjusting the power supply to said electrical drive motor accordingly.

10. The locomotive of claim 1 wherein said first and second torque arms are mounted off-set from a longitudinal axis of said locomotive to resist roll motions.

11. The locomotive of claim 1 including resilient spring mounts mounting said first and second wheel axles to said locomotive frame when each said spring mount comprises:
   a mounting block having an inboard and outboard side carried by each end of each of said first and second wheel axles;
   a first resilient spring having a first end mounted to each said inboard side of said mounting blocks and on an in board side of said wheel axle, and a second end attached to said locomotive frame;
   a second resilient spring having a first end attached to each said inboard side of said mounting blocks and on an out board side of said wheel axle and a second end attached to said locomotive frame;
   said each of first and second springs being mounted between said mounting block and locomotive frame at an incline to resist pitch forces.

12. A low-speed, high-traction industrial switching locomotive which automatically compensates for wheel slippage, weight transfer, and track variations comprising:
   a locomotive frame having an upper frame section and a lower frame section carried below said upper section;
   an interface which allows mating said upper and said lower frame sections together forming said locomotive frame integral and separation of said upper and lower frame sections as separated independent units;
   said upper and lower frame sections being of substantially equal weight and of a weight to allow said upper and lower sections when separated to be transported by truck on a highway and to be united at point of use as a locomotive;
   said upper frame section having mounted thereon a diesel engine driving an AC generator which delivers AC current to an AC drive cabinet;

said lower frame section carrying an AC drive motor driving a pair of spaced gear boxes driving a pair of spaced wheel axles; and, a power connector for connecting and disconnecting the output of said controller with said motor.

13. A locomotive of claim 12 wherein said power connector comprises a power transfer cable.

14. The locomotive of claim 12 including resilient spring mounts mounting said wheel axles to said lower frame wherein each said spring mount comprises:

a mounting block carried by opposing ends of each of said first and second wheel axles;

a first resilient spring having a first end mounted to said mounting block on an in board side of said wheel axle, and a second end attached to said locomotive frame;

a second resilient spring having a first end attached to said mounting block on an out board side of said wheel axle and a second end attached to said locomotive frame;

said first and second springs being mounted between said mounting block and locomotive frame at an incline to resist pitch forces.

15. A low-speed, high-traction industrial switching locomotive comprising:

a locomotive frame comprising an upper frame and a lower frame section of substantially equal length;

a first wheel axle carried by said lower frame section;

a second wheel axle carried by said lower frame section;

said first and second wheel axles being longitudinally spaced along a length of and connected with said lower frame section to define a frame wheel base between the center lines of said first and second fixed wheel axles and drive wheels carried by opposing ends of said first and second wheel axles for driving the locomotive on a rail;

a drive motor connected with said lower frame section and a gear box carried by said wheel axles being connected by a single drive shaft for driving said wheel axles;

an interface frame mating said upper frame and said lower frame together; and frame attachments for removably attaching said upper and lower frames together for use as a switching locomotive and allowing separation thereof for road transport.

16. The apparatus of claim 15 wherein said drive shaft has opposing ends extending from said drive motor in opposing directions along a longitudinal axis of said locomotive generally perpendicular to said wheel axles;

a power supply for supplying power to said drive motor and a drive control for controlling the supply of power to said drive motor;

a first gear box connecting a first end of said drive shaft to said first axle;

a second gear box connecting a second end of said drive shaft to said second axle;

at least one stabilizer element connected between each of said first and second gear boxes and said lower frame to resist pitch and roll forces on said gear boxes; and said wheel axles being mechanically interlocked through said drive shaft and said respective first and second gear boxes to automatically shift torque from the drive motor to the axles depending on traction available between the axle wheels on the rails so that wheel slippage, weight transfer, and and track variations are automatically compensated for.

17. The apparatus of claim 15 wherein said drive motor comprises an electrical drive motor.

18. The locomotive of claim 15 including an electrical power transfer cable connectable across said interface frame between said upper and lower frame sections for delivering power to said electrical motor.

19. A low-speed, high-traction industrial switching locomotive comprising:

a locomotive frame;

a first wheel axle carried said locomotive frame;

a second wheel axle carried by said locomotive frame;

said first and second wheel axles being longitudinally spaced along a length of said locomotive frame to define a frame wheel base between the center lines of said first and second fixed wheel axles and drive wheels carried by opposing ends of said first and second wheel axles for driving the locomotive on a rail;

a drive motor carried by said frame between said first and second axles having a drive shaft for driving said wheel axles;

a first gear box carried by said first wheel axle connecting a first end of said motor drive shaft to said first axle;

a second gear box carried by said second wheel axle connecting a second end of said motor drive shaft to said second axle;

first and second torque arms directly connected to said first and second gear boxes and said locomotive frame for stabilizing said gear boxes;

a pair of opposing elastomeric springs connecting said wheel axles to said locomotive frame; and said pair of springs including a first spring connected between said axle and locomotive frame on one side of said axle, and a second spring connected between an opposing side of said axle and said frame and so that each said wheel axle is independently and softly sprung to said locomotive frame for increased traction.

20. The locomotive of claim 19 wherein said first torque arm is connected between said first gear box and said locomotive frame on a motor side of said first wheel axle, and said second torque arm is connected between said second gear box and said locomotive frame on a motor side of said second wheel axle so that said torque arms effectively resist pitch motions about said wheel axles to effectively eliminate unintentional uncoupling of said locomotive from a coupled railroad car.

21. The locomotive of claim 20 wherein said first and second torque arms are mounted in opposing offset positions with respect to a longitudinal center line of said locomotive to resist roll forces imparted to said gear boxes.

22. The locomotive of claim 19 including resilient spring mounts mounting said first and second wheel axles to said locomotive frame wherein each said spring mount comprises:

a mounting block carried by opposing ends of each of said first and second wheel axles;

a first resilient spring having a first end mounted to said mounting block on an in board side of said wheel axle, and a second end attached to said locomotive frame;

a second resilient spring having a first end attached to said mounting block on an out board side of said wheel axle and a second end attached to said locomotive frame;

said first and second springs being mounted between said mounting block and locomotive frame at an incline do resist pitch forces.

* * * * *